United States Patent
Chen

(10) Patent No.: US 10,081,248 B2
(45) Date of Patent: Sep. 25, 2018

(54) APPARATUS FOR DETECTING A STATIC CURRENT IN A SECONDARY BATTERY OF A VEHICLE AND PROTECTING THE SECONDARY BATTERY

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 0 days.

(21) Appl. No.: 15/470,900

(22) Filed: Mar. 27, 2017

(65) Prior Publication Data
US 2017/0282719 A1   Oct. 5, 2017

(51) Int. Cl.
| H02J 7/00 | (2006.01) |
| B60L 3/00 | (2006.01) |
| B60L 3/04 | (2006.01) |
| B60L 11/18 | (2006.01) |
| H01M 10/48 | (2006.01) |
| H01M 2/34 | (2006.01) |

(52) U.S. Cl.
CPC ........... *B60L 3/0046* (2013.01); *B60L 3/0069* (2013.01); *B60L 3/04* (2013.01); *B60L 11/1879* (2013.01); *H01M 2/341* (2013.01); *H01M 2/348* (2013.01); *H01M 10/48* (2013.01); *H02J 7/0031* (2013.01); *H02J 7/0047* (2013.01); *H02J 7/0068* (2013.01); *B60L 2250/10* (2013.01); *H01M 2220/20* (2013.01); *H02J 2007/004* (2013.01); *H02J 2007/0037* (2013.01); *H02J 2007/0096* (2013.01)

(58) Field of Classification Search
CPC ...... H02J 7/0031; H02J 7/0047; H02J 7/0068; H02J 2007/0037; H02J 2007/004; H02J 2007/0096; B60L 3/0046; B60L 3/0069; B60L 3/04; B60L 11/1879; B60L 2250/10; H01M 2/341; H01M 2/348; H01M 10/48; H01M 2220/20
USPC ......................................................... 320/134
See application file for complete search history.

(56) References Cited

U.S. PATENT DOCUMENTS

| 2011/0300416 A1* | 12/2011 | Bertness | B60L 3/0046 429/49 |
| 2015/0202972 A1* | 7/2015 | Sugiyama | B60W 30/18054 701/22 |
| 2017/0237128 A1* | 8/2017 | Kubo | H01M 10/44 429/7 |

* cited by examiner

*Primary Examiner* — Nathaniel Pelton

(57) ABSTRACT

A battery-protecting apparatus is electrically connected to a secondary battery, a generator and a load unit of a vehicle. The generator provides electricity to the battery via the battery-protecting apparatus. The battery provides electricity to the load unit via the battery-protecting apparatus. The battery-protecting apparatus includes a detection unit, a switch, a processor, a controlling unit, a discharging loop, a wireless communication unit and a security loop.

12 Claims, 2 Drawing Sheets

APPARATUS FOR DETECTING A STATIC CURRENT IN A SECONDARY BATTERY OF A VEHICLE AND PROTECTING THE SECONDARY BATTERY

BACKGROUND OF INVENTION

1. Field of Invention

The present invention relates to a battery of a vehicle and, more particularly, to an apparatus for detecting a static current in a secondary battery of a vehicle and protecting the secondary battery accordingly.

2. Related Prior Art

A vehicle includes a generator, a rectifier module and a secondary battery for starting an engine. The generator is electrically connected to the rectifier module. The rectifier module is electrically connected to the secondary battery, lights, and a computer of the vehicle. Furthermore, the secondary battery is electrically connected to other electronic devices of the vehicle.

The secondary battery provides electricity for powering the computer, the lights and the other electronic devices when the engine is not started. Moreover, the secondary battery provides electricity for starting the engine of the vehicle. When the engine is started, the engine drives the generator to provide an alternate current (the "AC"). The rectifier module converts the AC to a direct current (the "DC"). Then, the secondary battery is charged with the AC, and the other electronic devices are powered by the AC.

The present invention is therefore intended to obviate or at least alleviate the problems encountered in prior art.

SUMMARY OF INVENTION

It is the primary objective of the present invention to provide an apparatus for detecting a static current in a secondary battery of a vehicle and protecting the secondary battery accordingly.

To achieve the above-mentioned objective, the battery-protecting apparatus electrically connected to a secondary battery, a generator and a load unit of a vehicle so that the generator provides electricity to the battery via the battery-protecting apparatus and that the battery provides electricity to the load unit via the battery-protecting apparatus, wherein the battery-protecting apparatus comprises: a detection unit comprising: a static detection loop for measuring the intensity of a current from the battery to determine whether electricity is leaked from the battery when the vehicle is stopped; and a dynamic detection loop comprising a voltage-detecting circuit for measuring the voltage of a current from the generator, a current-detecting circuit for measuring the voltage and intensity of a current from the battery, and a temperature-detecting circuit for measuring the temperature in the environment when the vehicle is stopped; a switch electrically connected to the detection unit and operable to turn on and off the static detection loop and the dynamic detection loop to choose one from the static detection loop and the dynamic detection loop for operation; a controlling unit comprising: a first circuit for transferring electricity to the battery from the generator, wherein first circuit comprises a switch operable to turn on and off the first circuit; a second circuit for transferring electricity to the load unit from the battery, wherein the second circuit) comprises a switch operable to turn on and off the second circuit; a third circuit comprising a switch operable to turn on and off the third circuit; and a fourth circuit electrically connected to the third circuit in parallel, wherein the fourth circuit comprises a switch operable to turn on and off the fourth circuit; a discharging loop electrically connected to the battery via the third and fourth circuits, and adapted for consuming the electricity in the battery; a wireless communication unit; a security loop for avoiding a strong current from the battery when the vehicle is in an anti-theft mode; and a processor electrically connected to the detection unit, the controlling unit, the discharging loop, the wireless communication unit and the security loop, wherein the processor is adapted for sending a signal to the controlling unit to cause the controlling unit to protect the battery based on the measured current intensities, voltage and temperature, wherein the processor is adapted for sending the measured current intensities, voltage and temperature to a portable communication device via the wireless communication unit to allow the portable communication device to be operated to control the battery-protecting apparatus.

Preferably, the static detection loop is able to measure a current as weak as 1 mA.

Preferably, a warning unit electrically connected to the processor, wherein the warning unit provides warning according to a signal received from the processor.

Preferably, the warning unit comprises an alarming element for providing warning sound according to the signal received from the processor.

Preferably, the warning unit comprises a lighting element for providing warning light according to the signal received from the processor.

Preferably, the static detection loop comprises a weak current-detecting circuit for measuring the intensity of a current from the battery.

Preferably, the current-detecting circuit of the dynamic detection loop comprises a strong current-detecting circuit for measuring the voltage and intensity of a current from the battery.

Preferably, the switch is a manual switch.

Preferably, the wireless communication unit comprises a Bluetooth transceiver.

Preferably, the security loop comprises a breaker loop.

Preferably, the processor is a CPU.

The other objective of the present invention lies in providing a method for protecting a secondary battery via using the battery-protecting apparatus in the above-mentioned, comprising the steps of: using the detection unit to measure the intensity IG of the current from the generator, the voltage V and intensity IB of the current from the battery, and the temperature T and send corresponding values to the processor which send the values to the portable communication device via the wireless communication unit; when the vehicle is stopped, turning on the static detection loop and turning off the dynamic detection loop to allow the static detection loop to measure and send the intensity IB to the processor which sends the intensity IB to the portable communication device via the wireless communication unit to allow the portable communication device to show the intensity IB to a user so that the user determines whether electricity is leaked from the battery by determining if the intensity IB is larger than what is necessary for normal operation of electronic devices of the vehicle; when the vehicle is started, turning off the static detection loop and turning on the dynamic detection loop to allow the dynamic detection loop to measure and send the intensities IG and IB, the voltage V and the temperature T to the processor which sends the current intensities IG and IB, the voltage V and the temperature T to the portable communication device via the wireless communication unit to allow the portable communication device to show the current intensities IG and IB, the voltage V and the temperature T to the user so that the user knows the status of the battery; when the battery-protecting apparatus is in an anti-theft mode, using the security loop to measure and send the intensity IB to the processor which compares the intensity IB with a predetermined basic intensity I1 which is set to be what is necessary for the normal operation of the electronic devices of the vehicle when the vehicle is stopped, and execute the following process: if IB≤I1, keeping the security loop on and providing electricity to the load unit from the battery via the second circuit and the security loop, thereby preventing lack of electricity from returning a computer of the vehicle to parameters which are set when the vehicle is made; if IB>I1, turning off the security loop to stop providing electricity to the load unit from the battery via the security loop; when the battery-protecting apparatus is in an operational mode, using the processor to compare the voltage V with a predetermined safe high voltage V1 and a predetermined safe low voltage V2, compare the temperature T with a predetermined safe temperature T1, compare the intensity IG with a predetermined safe high intensity I2, compare the intensity IB with a predetermined safe high intensity I3, and execute the following process: if V≥V1, sending a signal to the controlling unit from the processor to turn on the third circuit to allow the battery to provide electricity to the discharging loop via the third circuit, thereby preventing over-charging the battery; when the third circuit is on, if V<V1, sending a signal to the controlling unit from the processor to turn off the third circuit to stop providing electricity to the discharging loop from the battery via the third circuit; if V≤V2, sending a signal to the controlling unit from the processor to turn off the second circuit to stop providing electricity to the load unit from the battery via the second circuit, thereby preventing the battery from over-discharging; when the second circuit is off, if V>V2, sending a signal to the controlling unit from the processor to turn on the second circuit to allow the battery to provide electricity to the load unit via the second circuit; if T≥T1, sending a signal to the controlling unit from the processor to turn on the fourth circuit to allow the battery to provide electricity to the discharging loop via the fourth circuit to consume the electricity in the battery, thereby protecting the battery from over-heating; and when the fourth circuit is on, if T<T1, sending a signal to the controlling unit from the processor to turn off the fourth circuit to stop providing electricity to the discharging loop from the battery via the fourth circuit.

The further objective of the present invention is to provide the user is not using the vehicle, the static detection loop measures the intensity of the current from the battery, and helps the user determine whether the vehicle is consuming an excessive amount of electricity in the static mode. Thus, the user can have the vehicle checked to determine whether there is leakage of electricity from the battery and take actions to protect the battery.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
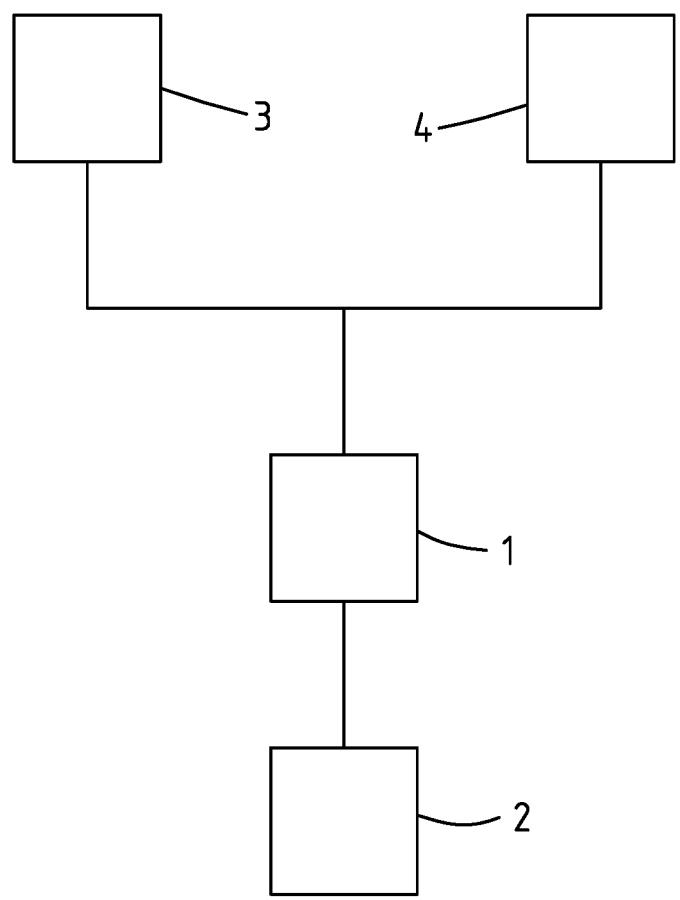
FIG. 1 is a block diagram of a vehicle with a battery-protecting apparatus according to the preferred embodiment of the present invention.

Referring to FIG. 1, a vehicle such as a car, a truck, a scooter and a motorcycle includes a secondary battery (2), a generator (3), a load unit (4) and a battery-protecting apparatus (1) according to the preferred embodiment of the present invention. The battery-protecting apparatus (1) is electrically connected to the battery (2), the generator (3) and the load unit (4). The generator (3) includes a generator electrically connected to a rectifier. The load unit (4) includes electric and/or electronic elements such as lamps and a computer of the vehicle. The generator (3) provides electricity to the battery (2) via the battery-protecting apparatus (1), thereby charging the battery (2). The battery (2) provides electricity to the load unit (4) via the battery-protecting apparatus (1), thereby powering all electric and/or electronic elements of the vehicle.

Figure 2:
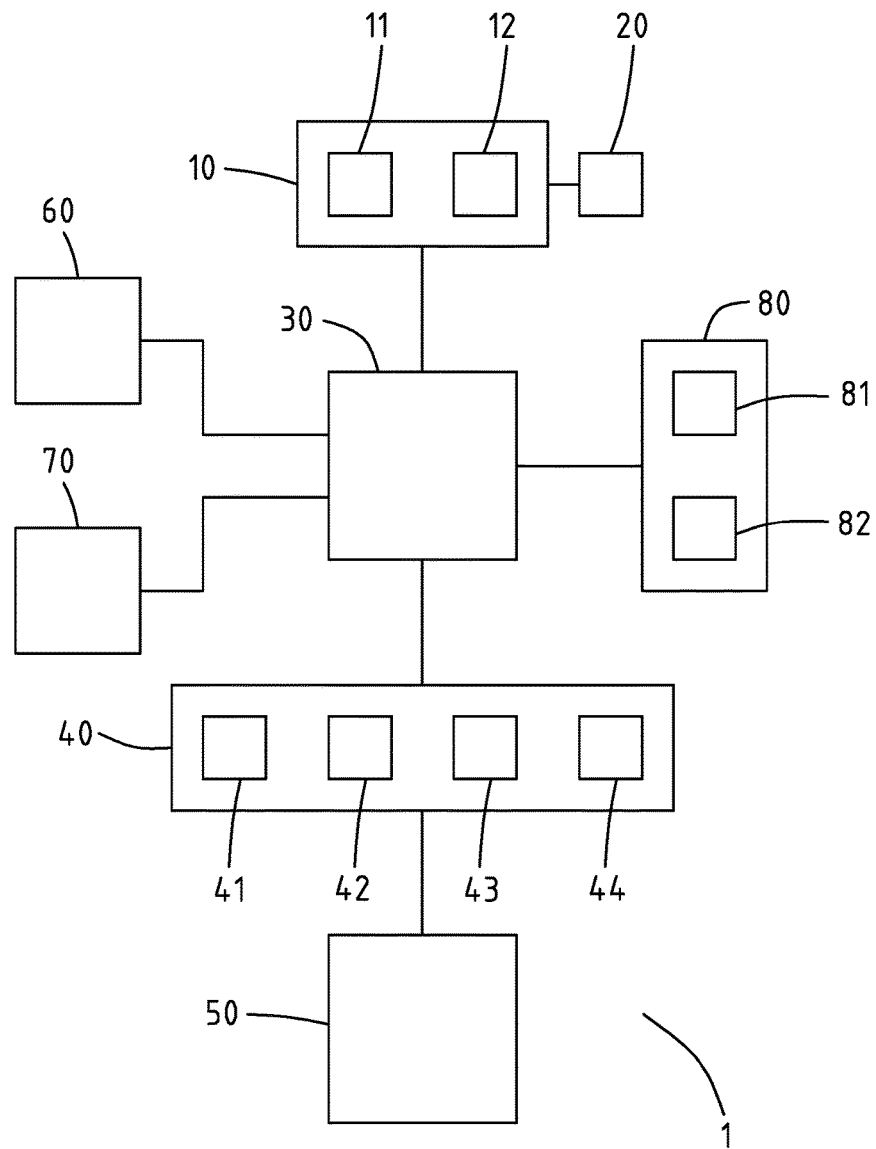
FIG. 2 is a block diagram of the battery-protecting apparatus shown in FIG. 1.

Referring to FIG. 2, the battery-protecting apparatus (1) includes a detection unit (10), a switch (20), a processor (30), a controlling unit (40), a discharging loop (50), a wireless communication unit (60), a security loop (70), and a warning unit (80). The detection unit (10), the controlling unit (40), the discharging loop (50), the wireless communication unit (60), the security loop (70) and the warning unit (80) are electrically connected to the processor (30). The switch (20) is electrically connected to the detection unit (10).

The detection unit (10) includes a static detection loop (11) and a dynamic detection loop (12). The static detection loop (11) is a weak current-detecting circuit. When the vehicle is stopped, the static detection loop (11) measures a current from the battery (2), and sends a value of the intensity of the current to the processor (30). Based on the value, a user determines whether there is leakage of electricity from the battery (2) when the vehicle is stopped. The static detection loop (11) measures a current as weak as 1 mA.

The dynamic detection loop (12) includes a voltage-detecting circuit, a strong current-detecting circuit and a temperature-detecting circuit. When the vehicle is started, the dynamic detection loop (12) measures the intensity of a current provided from the generator (3), the voltage and intensity of the current from the battery (2), and the temperature of the environment, and sends the measured values to the processor (30).

The switch (20) is a manual switch operable to turn on and off the static detection loop (11) and the dynamic detection loop (12). Thus, the user operates the switch (20) to choose the static detection loop (11) when the vehicle is stopped or the dynamic detection loop (12) when the vehicle is started.

The processor (30) is preferably a CPU for sending signals to the controlling unit (40), the wireless communication unit (60), the security unit (70) and the warning unit (80) according to the voltage, current intensities and temperature measured by the detection unit (10). Thus, the controlling unit (40) is actuated to protect the battery (2).

The controlling unit (40) includes a first circuit (41), a second circuit (42), a third circuit (43) and a fourth circuit (44). The first circuit (41) is electrically connected to the battery (2) and the generator (3) to allow the generator (3)

to provide electricity to the battery (2) thereby. The second circuit (42) is electrically connected to the battery (2) and the load unit (4) to allow the battery (2) to provide electricity to the load unit (4) thereby. The third circuit (43) and the fourth circuit (44) are arranged in parallel. The third circuit (43) and the fourth circuit (44) are electrically connected to the battery (2) and the discharging loop (50) to allow the battery (2) to provide electricity to the discharging loop (50) via the third circuit (43) and/or the fourth circuit (44). Each of the second circuit (42), the third circuit (43) and the fourth circuit (44) is provided with a switch (not shown) operable to turn it on and off.

The discharging loop (50) is used to consume the electricity in the battery (2).

The wireless communication unit (60) is preferably a Bluetooth transceiver. The wireless communication unit (60) is operable for two-way communication with a portable communication device such as a cell phone equipped with at least one application program. Thus, the processor (30) is in communication of signals with the portable communication device via the wireless communication unit (60) to enable the user to know the voltage and the intensity of the current from the battery (2), the intensity of the current from the generator (3) and the temperature on the portable communication device, and use the portable communication device to operate the battery-protecting apparatus (1).

The security loop (70) is preferably a breaker loop electrically connected to the battery (2) and the load unit (4). The security loop (70) is electrically connected to the second circuit (42) in series, and operable to connect the battery (2) to the load unit (4) or separate them from each other. When the vehicle is in an anti-theft mode, the security loop (70) prevents any strong current from the battery (2).

The warning unit (80) includes an alarming element (81) and/or a lighting element (82). The warning unit (80) receives the signals from the processor (30), and accordingly provides warning sound and/or light. In detail, based the voltage, current intensities and temperature measured by the detection unit (10), the processor (30) sends signals to the warning unit (80) to actuate the warning unit (80) to provide the warming sound and/or light to warm the user. The warning unit (80) is an optional unit for the battery-protecting apparatus (1).

The switch (20) and the warning unit (80) can be arranged on the dashboard of the vehicle. Therefore, the user can easily operate the switch (20) and observe the warning unit (80).

The detection unit (10) measures the intensity IG of the current from the generator (3), the voltage V and intensity IB of the current from the battery (2) and the temperature T, and sends the measured values to the processor (30). The processor (30) transfers the values to the wireless communication unit (60) that relays the values to the portable communication device in the hand of the user. The application program run in the portable communication device reads the values and shows them on a display of the portable communication device. Based on the values shown on the portable communication device, the user knows and controls the status of the battery (2) and the generator (3).

As the vehicle is stopped, the switch (20) is operated to turn on the static detection loop (11) and turn off the dynamic detection loop (12). Accordingly, the static detection loop (11) measures the intensity IB of the current from the battery (2), and sends the intensity IB to the processor (30) which relays the intensity IB to the wireless communication unit (60). The wireless communication unit (60) transfers the intensity IB to the portable communication device. The portable communication device shows the intensity IB to allow the user to know and control the status of the battery (2) and determines whether electricity is leaked from the battery (2) except for necessary electricity for powering the electric and/or electronic devices of the vehicle such as the computer when the vehicle is stopped.

When the vehicle is started, the switch (20) is used to turn off the static detection loop (11) and turn on the dynamic detection loop (12). The dynamic detection loop (12) measures the intensity IG of the current from the generator (3), the voltage V and intensity IB of the current from the battery (2), and the temperature T, and sends the voltage V, the current intensities IG and IB and the temperature T to the processor (30). The processor (30) transfers the voltage V, the current intensities IG and IB and the temperature T to the wireless communication unit (60). The wireless communication unit (60) transfers the voltage V, the current intensities IG and IB and the temperature T to the portable communication device to enable the user to know and control the status of the battery (2).

The user uses the portable communication device to turn the battery-protecting apparatus (1) into an anti-theft mode. The security loop (70) measures the intensity of the current from the battery (2), and sends the current intensity IB to the processor (30). The processor (30) compares the current intensity value IB with a predetermined basic current intensity I1. The basic current intensity I1 is set to be the intensity of a current that the battery-protecting apparatus (1) has to provide to make the computer effectively operate when the vehicle is stopped. Based on the comparison, the battery-protecting apparatus (1) takes further actions.

If IB is smaller than or identical to I1, the security loop (70) will be kept on, and the battery (2) will provide electricity to the load unit (4) via the second circuit (42) and the security loop (70). Thus, parameters in the computer will not be turned back to the values that are set when the computer is first made due to lack of electricity.

If IB is larger than I1, the processor (30) will send a signal to the warning unit (80) and turn off the security loop (70). Thus, the battery (2) does provide electricity to the load unit (4) via the security loop (70). Based on the signal from the processor (30), the warning unit (80), which includes the alarming element (81) and/or the lighting element (82), sends warning sound and/or light. It should be noted that if the anti-theft mode is not cancelled and there is an attempt to start the engine of the vehicle by causing the battery (2) to provide an adequately strong current to the load unit (4), the security loop (70) will be turned off if IB>I1. Hence, the engine of the vehicle cannot be started and the vehicle cannot be stolen.

The user uses the portable communication device to turn the battery-protecting apparatus (1) to an operational mode from the anti-theft mode. The processor (30) compares the voltage V with a predetermined safe high voltage V1 and a predetermined safe low voltage V2, compares the temperature T with a predetermined safe temperature T1, compares the current intensity value IG with a predetermined safe strong current I2, and compares the current intensity value IB with a predetermined safe strong current I3. Based on the comparison, actions will be taken.

If V is larger than or identical to V1, the processor (30) will send signals to the controlling unit (40) and the warning unit (80). The third circuit (43) will be turned on. The battery (2) will provide electricity to the discharging loop (50) via the third circuit (43). The electricity in the battery (2) is consumed by the discharging loop (50), thereby preventing over-charging the battery (2). For example, where the battery (2) is an Li—Fe cell that includes a built-in management system with a protective function, risks that the battery (2) abruptly stops providing electricity and stops the vehicle when the battery (2) is fully charged are avoided. Based on the signal from the processor (30), the warning unit (80), which includes the alarming element (81) and/or the lighting element (82), provides warning sound and/or warning light to warn the user.

Where the third circuit (43) is on, if V is lower than V1, the processor (30) will send signals to the controlling unit (40) and the warning unit (80). The third circuit (43) will be turned off. The battery (2) cannot continue to provide electricity to the discharging loop (50). Based on the signal from the processor (30), the warning unit (80), which includes the alarming element (81) and/or the lighting element (82), stops providing warning sound and/or warning light.

If V is lower than or identical to V2, the processor (30) will send signals to the controlling unit (40) and the warning unit (80). The second circuit (42) will be turned off. The battery (2) cannot provide electricity to the load unit (4) via the second circuit (42). Thus, the battery (2) will not over-discharge. Based on the signal from the processor (30), the warning unit (80), which includes the alarming element (81) and/or the lighting element (82), provides warning sound and/or warning light to warn the user.

Where the second circuit (42) is off, if V is higher than V2, the processor (30) will send signals to the controlling unit (40) and the warning unit (80). The second circuit (42) will be turned on to allow the battery (2) to provide electricity to the load unit (4). Based on the signal from the processor (30), the warning unit (80), which includes the alarming element (81) and/or the lighting element (82), stops providing warning sound and/or warning light.

If T is higher than T1, the processor (30) will send signals to the controlling unit (40) and the warning unit (80). The fourth circuit (44) will be turned on to allow the battery (2) to provide electricity to the discharging loop (50) via the fourth circuit (44). The electricity in the battery (2) is consumed by the discharging loop (50). Thus, risks that the battery (2) is damaged due to high temperature are avoided. Based on the signal from the processor (30), the warning unit (80), which includes the alarming element (81) and/or the lighting element (82), provides warning sound and/or warning light to warn the user.

When the fourth circuit (44) is on, if T is smaller than T1, the processor (30) will send signals to the controlling unit (40) and the warning unit (80). The fourth circuit (44) is turned off to stop providing electricity to the discharging loop (50) from the battery (2). Based on the signal from the processor (30), the warning unit (80), which includes the alarming element (81) and/or the lighting element (82), stops providing the warning sound and/or warning light.

If IG is larger than I2, the processor (30) will send a signal to the warning unit (80). Based on the signal from the processor (30), the warning unit (80), which includes the alarming element (81) and/or the lighting element (82), provides warning sound and/or warning light.

If IB is larger than I3, the processor (30) will send a signal to the warning unit (80). Based on the signal from the processor (30), the warning unit (80), which includes the alarming element (81) and/or the lighting element (82), provides warning sound and/or warning light. Thus, the user can pay attention to the electronic devices of the vehicle.

It should be noted that when the user is not using the vehicle, the static detection loop (11) measures the intensity of the current from the battery (2), and helps the user determine whether the vehicle is consuming an excessive amount of electricity in the static mode. Thus, the user can have the vehicle checked to determine whether there is leakage of electricity from the battery (2) and take actions to protect the battery (2) if necessary.

The battery (2) can be a starting battery for starting the engine of the vehicle or a motor-powering battery for a hybrid vehicle. The battery (2) can be a lead-acid battery or a Li—Fe battery.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A battery-protecting apparatus electrically connected to a secondary battery (2), a generator (3) and a load unit (4) of a vehicle so that the generator (3) provides electricity to the battery (2) via the battery-protecting apparatus and that the battery (2) provides electricity to the load unit (4) via the battery-protecting apparatus, wherein the battery-protecting apparatus comprises:
  a detection unit (10) comprising:
    a static detection loop (11) for measuring the intensity of a current from the battery (2) to determine whether electricity is leaked from the battery (2) when the vehicle is stopped; and
    a dynamic detection loop (12) comprising a voltage-detecting circuit for measuring the voltage of a current from the generator (3), a current-detecting circuit for measuring the voltage and intensity of a current from the battery (2), and a temperature-detecting circuit for measuring the temperature in the environment when the vehicle is stopped;
  a switch (20) electrically connected to the detection unit (10) and operable to turn on and off the static detection loop (11) and the dynamic detection loop (12) to choose one from the static detection loop (11) and the dynamic detection loop (12) for operation;
  a controlling unit (40) comprising:
    a first circuit (41) for transferring electricity to the battery (2) from the generator (3), wherein first circuit (41) comprises a switch operable to turn on and off the first circuit (41);
    a second circuit (42) for transferring electricity to the load unit (4) from the battery (2), wherein the second circuit (42) comprises a switch operable to turn on and off the second circuit (42);
    a third circuit (43) comprising a switch operable to turn on and off the third circuit (43); and
    a fourth circuit (44) electrically connected to the third circuit (43) in parallel, wherein the fourth circuit (44) comprises a switch operable to turn on and off the fourth circuit (44);
  a discharging loop (50) electrically connected to the battery (2) via the third and fourth circuits (43, 44), and adapted for consuming the electricity in the battery (2);
  a wireless communication unit (60);
  a security loop (70) for avoiding a strong current from the battery (2) when the vehicle is in an anti-theft mode; and
  a processor (30) electrically connected to the detection unit (10), the controlling unit (40), the discharging loop (50), the wireless communication unit (60) and the security loop (70), wherein the processor (30) is adapted for sending a signal to the controlling unit (40)

to cause the controlling unit (40) to protect the battery (2) based on the measured current intensities, voltage and temperature, wherein the processor (30) is adapted for sending the measured current intensities, voltage and temperature to a portable communication device via the wireless communication unit (60) to allow the portable communication device to be operated to control the battery-protecting apparatus.

2. The battery-protecting apparatus according to claim 1, wherein the static detection loop (11) is able to measure a current as weak as 1 mA.

3. The battery-protecting apparatus according to claim 1, further comprising a warning unit (80) electrically connected to the processor (30), wherein the warning unit (80) provides warning according to a signal received from the processor (30).

4. The battery-protecting apparatus according to claim 3, wherein the warning unit (80) comprises an alarming element (81) for providing warning sound according to the signal received from the processor (30).

5. The battery-protecting apparatus according to claim 3, wherein the warning unit (80) comprises a lighting element (82) for providing warning light according to the signal received from the processor (30).

6. The battery-protecting apparatus according to claim 1, wherein the static detection loop (11) comprises a weak current-detecting circuit for measuring the intensity of a current from the battery (2).

7. The battery-protecting apparatus according to claim 1, wherein the current-detecting circuit of the dynamic detection loop (12) comprises a strong current-detecting circuit for measuring the voltage and intensity of a current from the battery (2).

8. The battery-protecting apparatus according to claim 1, wherein the switch (20) is a manual switch.

9. The battery-protecting apparatus according to claim 1, wherein the wireless communication unit (60) comprises a Bluetooth transceiver.

10. The battery-protecting apparatus according to claim 1, wherein the security loop (70) comprises a breaker loop.

11. The battery-protecting apparatus according to claim 1, wherein the processor (30) is a CPU.

12. A method for protecting a secondary battery via using the battery-protecting apparatus according to claim 1, comprising the steps of:

using the detection unit (10) to measure the intensity IG of the current from the generator (3), the voltage V and intensity IB of the current from the battery (2), and the temperature T and send corresponding values to the processor (30) which send the values to the portable communication device via the wireless communication unit (60);

when the vehicle is stopped, turning on the static detection loop (11) and turning off the dynamic detection loop (12) to allow the static detection loop (11) to measure and send the intensity IB to the processor (30) which sends the intensity IB to the portable communication device via the wireless communication unit (60) to allow the portable communication device to show the intensity IB to a user so that the user determines whether electricity is leaked from the battery (2) by determining if the intensity IB is larger than what is necessary for normal operation of electronic devices of the vehicle;

when the vehicle is started, turning off the static detection loop (11) and turning on the dynamic detection loop (12) to allow the dynamic detection loop (12) to measure and send the intensities IG and IB, the voltage V and the temperature T to the processor (30) which sends the current intensities IG and IB, the voltage V and the temperature T to the portable communication device via the wireless communication unit (60) to allow the portable communication device to show the current intensities IG and IB, the voltage V and the temperature T to the user so that the user knows the status of the battery (2);

when the battery-protecting apparatus (1) is in an anti-theft mode, using the security loop (70) to measure and send the intensity IB to the processor (30) which compares the intensity IB with a predetermined basic intensity I1 which is set to be what is necessary for the normal operation of the electronic devices of the vehicle when the vehicle is stopped, and execute the following process:

if IB≤I1, keeping the security loop (70) on and providing electricity to the load unit (4) from the battery (2) via the second circuit (42) and the security loop (70), thereby preventing lack of electricity from returning a computer of the vehicle to parameters which are set when the vehicle is made;

if IB>I1, turning off the security loop (70) to stop providing electricity to the load unit (4) from the battery (2) via the security loop (70);

when the battery-protecting apparatus (1) is in an operational mode, using the processor (30) to compare the voltage V with a predetermined safe high voltage V1 and a predetermined safe low voltage V2, compare the temperature T with a predetermined safe temperature T1, compare the intensity IG with a predetermined safe high intensity I2, compare the intensity IB with a predetermined safe high intensity I3, and execute the following process:

if V≥V1, sending a signal to the controlling unit (40) from the processor (30) to turn on the third circuit (43) to allow the battery (2) to provide electricity to the discharging loop (50) via the third circuit (43), thereby preventing over-charging the battery (2);

when the third circuit (43) is on, if V<V1, sending a signal to the controlling unit (40) from the processor (30) to turn off the third circuit (43) to stop providing electricity to the discharging loop (50) from the battery (2) via the third circuit (43);

if V≤V2, sending a signal to the controlling unit (40) from the processor (30) to turn off the second circuit (42) to stop providing electricity to the load unit (4) from the battery (2) via the second circuit (42), thereby preventing the battery (2) from over-discharging;

when the second circuit (42) is off, if V>V2, sending a signal to the controlling unit (40) from the processor (30) to turn on the second circuit (42) to allow the battery (2) to provide electricity to the load unit (4) via the second circuit (42);

if T≥T1, sending a signal to the controlling unit (40) from the processor (30) to turn on the fourth circuit (44) to allow the battery (2) to provide electricity to the discharging loop (50) via the fourth circuit (44) to consume the electricity in the battery (2), thereby protecting the battery (2) from over-heating; and when the fourth circuit (44) is on, if T<T1, sending a signal to the controlling unit (40) from the processor (30) to turn off the fourth circuit (44) to stop providing electricity to the discharging loop (50) from the battery (2) via the fourth circuit (44).

\* \* \* \* \*